United States Patent
Na et al.

(10) Patent No.: US 9,855,722 B2
(45) Date of Patent: Jan. 2, 2018

(54) COMPOSITE ARTICLE AND METHOD FOR MAKING SAME

(71) Applicants: SHENZHEN FUTAIHONG PRECISION INDUSTRY CO., LTD., Shenzhen (CN); FIH (Hong Kong) Limited, Kowloon (HK)

(72) Inventors: Li-Hong Na, Shenzhen (CN); Xu Liu, Shenzhen (CN)

(73) Assignees: SHENZHEN FUTAIHONG PRECISION INDUSTRY CO., LTD., Shenzhen (CN); FIH (Hong Kong) Limited, Kowloon (HK)

(*) Notice: Subject to any disclaimer, the term of this patent is extended or adjusted under 35 U.S.C. 154(b) by 934 days.

(21) Appl. No.: 13/864,652

(22) Filed: Apr. 17, 2013

(65) Prior Publication Data

US 2014/0186616 A1      Jul. 3, 2014

(30) Foreign Application Priority Data

Dec. 29, 2012 (CN) .......................... 2012 1 0588212

(51) Int. Cl.
*B32B 7/12*     (2006.01)
*B32B 27/08*    (2006.01)
*B29C 45/14*    (2006.01)
*C04B 37/00*    (2006.01)
*B29C 65/48*    (2006.01)

(52) U.S. Cl.
CPC .......... *B32B 7/12* (2013.01); *B29C 45/14311* (2013.01); *B32B 27/08* (2013.01); *C04B 37/008* (2013.01); *B29C 65/482* (2013.01); *C04B 2237/32* (2013.01); *C04B 2237/708* (2013.01); *Y10T 428/264* (2015.01); *Y10T 428/31667* (2015.04)

(58) Field of Classification Search
None
See application file for complete search history.

(56) References Cited

U.S. PATENT DOCUMENTS

| | | | | |
|---|---|---|---|---|
| 3,442,845 A | * | 5/1969 | Columbus | C09J 7/00 524/24 |
| 3,640,791 A | * | 2/1972 | Rosenheim | 156/230 |
| 4,957,677 A | * | 9/1990 | Katoh et al. | 264/135 |
| 5,190,997 A | | 3/1993 | Lindemann et al. | |
| 6,253,655 B1 | | 7/2001 | Lyons et al. | |

(Continued)

FOREIGN PATENT DOCUMENTS

| | | |
|---|---|---|
| CN | 1033066 A | 5/1989 |
| CN | 1022226 C | 9/1993 |

(Continued)

OTHER PUBLICATIONS

Greer et al., Importance of Mold Temperature on the Properties of PPS Parts, Solvay, 2015, retrieved from http://www.solvayplastics.com/sites/solvayplastics/EN/Solvay%20Plastics%20Literature/Ryton-PPS-Mold-Temperature.pdf.*

*Primary Examiner* — Callie E Shosho
*Assistant Examiner* — Daniel D Lowrey
(74) *Attorney, Agent, or Firm* — ScienBiziP, P.C.

(57) ABSTRACT

A composite article includes a ceramic part, a plastic part, and an adhesive layer connecting the ceramic part to the plastic part. The adhesive layer includes polyvinyl acetate, polyvinyl alcohol, dibutyl phthalate, and sec-butyl acetate.

4 Claims, 2 Drawing Sheets

(56) References Cited

U.S. PATENT DOCUMENTS

| | | | |
|---|---|---|---|
| 6,448,313 B1* | 9/2002 | Patel | C09D 5/008 |
| | | | 524/156 |
| 2010/0014232 A1* | 1/2010 | Nishimura | 361/679.3 |
| 2010/0233389 A1* | 9/2010 | Suzuki | C08J 5/18 |
| | | | 428/1.33 |
| 2012/0059103 A1* | 3/2012 | Lux et al. | 524/388 |

FOREIGN PATENT DOCUMENTS

| | | |
|---|---|---|
| JP | 01-295810 A | 11/1989 |
| JP | 2004-140342 A | 5/2004 |
| WO | 2011/129412 A1 | 10/2011 |

* cited by examiner

COMPOSITE ARTICLE AND METHOD FOR MAKING SAME

BACKGROUND

1. Technical Field

The present disclosure relates to composite articles, especially to a ceramic-and-plastic composite article and a method for making the composite article.

2. Description of the Related Art

A typical process for joining a ceramic part and a plastic part may include the following steps: (1) the ceramic part is coated with a liquid adhesive on the combined surface; (2) the plastic part is attached to the combined surface of the ceramic part under a certain pressure to combine the ceramic part and the plastic part together. However, during the joining process, the liquid adhesive usually flows out of the combined surface, which adversely affects the appearance of the composite article. Furthermore, the bonding strength between the ceramic part and the plastic part is not strong enough due to a poor adhesive property of the current liquid adhesive.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the composite article. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
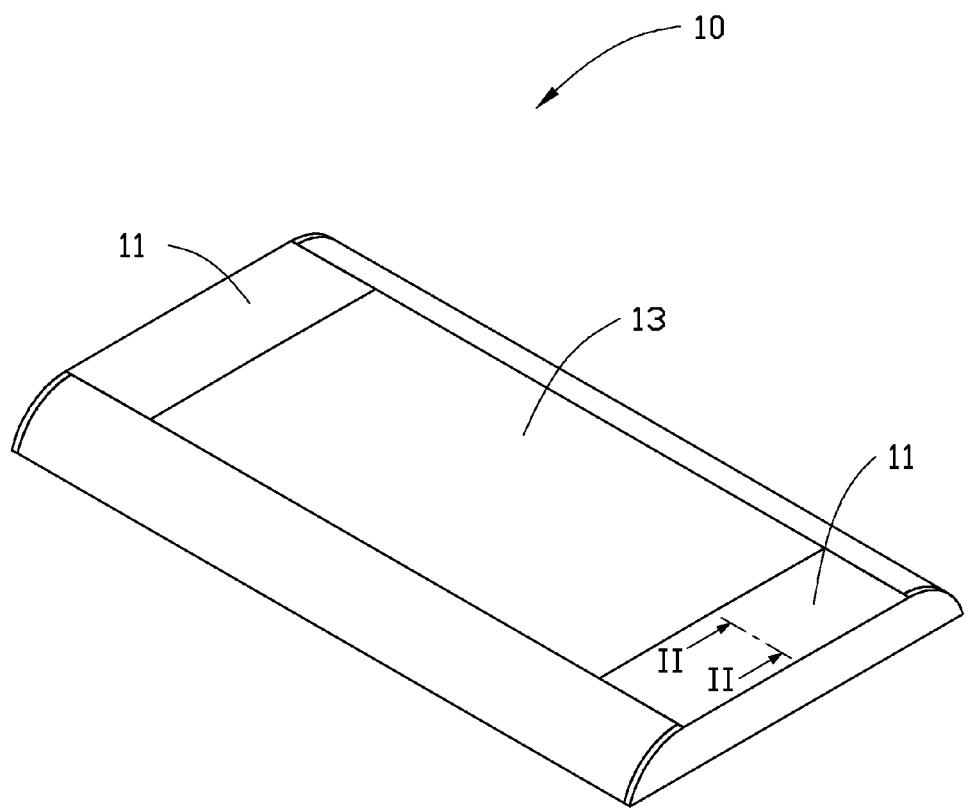
FIG. 1 is a schematic view of an example of a ceramic-and-plastic composite article.

An exemplary process for making a ceramic-and-plastic composite article 10 as shown in FIG. 1 may includes the following steps.

A ceramic part 11 is provided.

A liquid adhesive is manufactured. The liquid adhesive has a high-temperature resistance. The liquid adhesive contains polyvinyl acetate, polyvinyl alcohol, dibutyl phthalate, sec-butyl acetate, and organic solvent. The polyvinyl acetate and the polyvinyl alcohol are first dissolved in the organic solvent. The liquid adhesive is made by mixing polyvinyl acetate solution with a mass percentage of 55%, polyvinyl alcohol solution with a mass percentage of 5%, dibutyl phthalate, and the sec-butyl acetate together. In the liquid adhesive, the volume ratio of the polyvinyl acetate solution, the polyvinyl alcohol solution, the dibutyl phthalate, and the sec-butyl acetate is 1~1.2:15~17:0.3~0.5:2.5~3.0. The organic solvent is alcohol in the exemplary embodiment, but not limited to alcohol. The liquid adhesive may also contain small amount of thickening agent, preservative, and coupling agent.

The liquid adhesive is coated on at least one surface of the ceramic part 11 and then dried to form an adhesive layer 15. The adhesive layer 15 has a thickness of about 20 µm to about 40 µm. The drying of the liquid adhesive can make the organic solvent volatilize completely. The drying of the liquid adhesive may be carried out at a temperature of 40° C. in an oven (not shown) for at least 30 min or at room temperature for at least 24 hours.

A plastic part 13 is formed by injection molding in a mold (not shown) on the adhesive layer 15 of the ceramic part 11, thereby finishing the ceramic-and-plastic composite article 10. The plastic part 13 is made of conventional resins having a molding temperature lower than 170° C. (a relative lower temperature), thus the adhesive layer 15 will not lose effectiveness during the molding process. Further, to assure the good adhesiveness of the adhesive layer 15, the temperature of the mold during the molding process is also lower than 170° C.

The ceramic-and-plastic composite article 10 may be polished and painted to present an aesthetic appearance.

FIG. 1 shows the ceramic-and-plastic composite article 10 which includes a ceramic part 11 and two plastic parts 13 formed on the ceramic part 11. The plastic parts 13 are injection molded on the ceramic part 11. The plastic parts 13 are made of conventional resins having a molding temperature lower than 170° C.

Figure 2:
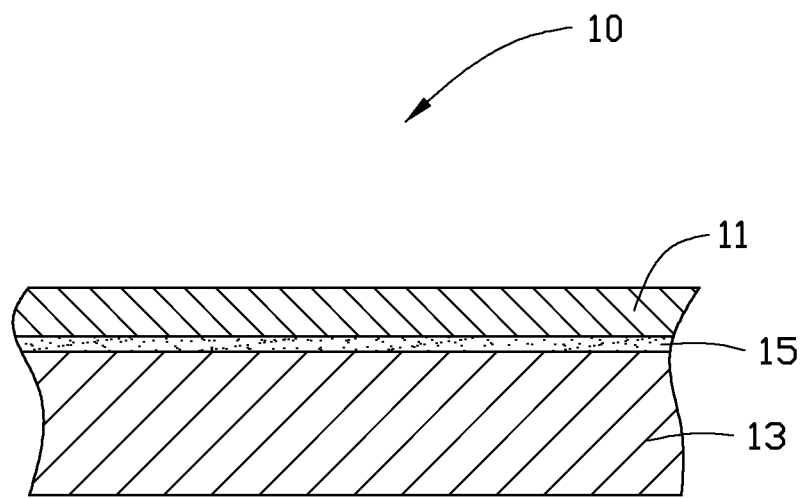
FIG. 2 is a cross-sectional view of FIG. 1, taken along the line II-II.

The composite article 10 further includes an adhesive layer 15 connecting the ceramic part 11 and the plastic parts 13 as shown in FIG. 2. The adhesive layer 15 contains polyvinyl acetate, polyvinyl alcohol, dibutyl phthalate, and sec-butyl acetate. The adhesive layer 15 has a thickness of about 20 µm to about 40 µm.

The liquid adhesive is made by mixing polyvinyl acetate solution with a mass percentage concentration of 55%, polyvinyl alcohol solution with a mass percentage concentration of 5%, dibutyl phthalate, and sec-butyl acetate together, wherein the volume ratio of the polyvinyl acetate solution, the polyvinyl alcohol solution, the dibutyl phthalate, and the sec-butyl acetate is 1~1.2:15~17:0.3~0.5: 2.5~3.0. The organic solvent is alcohol for example, but not limited to alcohol.

Three ceramic-and-plastic composite articles 10 were made by the process described above. The drawing force between the ceramic part 11 and the plastic part 13 of each composite article 10 was tested using a SE Precision Load Tester (Model: 1220 (H)S). Each composite article 10 was tested for six times. The test results are shown in Table 1. The test results indicates that the drawing force between the ceramic part 11 and the plastic part 13 is strong, so the ceramic part 11 and the plastic part 13 can bond with each other firmly.

TABLE 1

| Sample No. | A | B | C | D | E | F | Average |
|---|---|---|---|---|---|---|---|
| 1 | 260.7 | 261.3 | 289.2 | 281.6 | 259.5 | 262.6 | 269.15 |
| 2 | 263.1 | 265.4 | 286.7 | 284.3 | 262.3 | 263.4 | 270.87 |
| 3 | 261.9 | 260.5 | 290.8 | 286.9 | 269.5 | 260.7 | 271.72 |

The exemplary liquid adhesive has a good adhesiveness, which combines the ceramic part 11 and the plastic part 13 firmly. Since the liquid adhesive coated on the ceramic part 11 is dried before combining the plastic part 13, the adhesive layer 15 will not flow out of the bonding surface of the ceramic part 11 and plastic part 13.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for making a composite article, comprising:
providing a ceramic part;
mixing polyvinyl acetate, polyvinyl alcohol, dibutyl phthalate, sec-butyl acetate, and organic solvent together to make a liquid adhesive;
coating the liquid adhesive on at least one surface of the ceramic part and drying the liquid adhesive to form an adhesive layer;
injection molding a plastic part on the adhesive layer of the ceramic part;
wherein the liquid adhesive is made by mixing polyvinyl acetate solution with a mass percentage concentration of 55%, polyvinyl alcohol solution with a mass percentage concentration of 5%, dibutyl phthalate and sec-butyl acetate together, and the volume ratio of the polyvinyl acetate solution, the polyvinyl alcohol solution, the dibutyl phthalate and the sec-butyl acetate is 1~1.2:15~17:0.3~0.5:2.5~3.0; and
wherein the adhesive layer has a thickness of about 20 μm to about 40 μm.

2. The method as claimed in claim 1, wherein the organic solvent is alcohol.

3. The method as claimed in claim 1, wherein the drying of the liquid adhesive is carried out at a temperature of 40° C. for at least 30 min or at a room temperature for at least 24 hours.

4. The method as claimed in claim 1, wherein the plastic part is made of a resin having a molding temperature lower than 170° C.

* * * * *